(12) United States Patent
Blair

(10) Patent No.: US 10,287,167 B2
(45) Date of Patent: *May 14, 2019

(54) LARGE SCALE OXIDIZED GRAPHENE PRODUCTION FOR INDUSTRIAL APPLICATIONS

(71) Applicant: University of Central Florida Research Foundation, Inc., Orlando, FL (US)

(72) Inventor: Richard Blair, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,386

(22) Filed: Jul. 25, 2017

(65) Prior Publication Data

US 2017/0334728 A1    Nov. 23, 2017

Related U.S. Application Data

(63) Continuation of application No. 14/772,898, filed as application No. PCT/US2014/021810 on Mar. 7, 2014, now Pat. No. 9,758,379.

(60) Provisional application No. 61/774,633, filed on Mar. 8, 2013.

(51) Int. Cl.
| | | |
|---|---|---|
| *C01B 32/19* | (2017.01) | |
| *C01B 32/23* | (2017.01) | |
| *C01B 32/182* | (2017.01) | |
| *C01B 32/192* | (2017.01) | |
| *C01B 32/194* | (2017.01) | |
| *C01B 32/198* | (2017.01) | |

(52) U.S. Cl.
CPC .......... *C01B 32/198* (2017.08); *C01B 32/182* (2017.08); *C01B 32/19* (2017.08); *C01B 32/192* (2017.08); *C01B 32/194* (2017.08); *C01B 32/23* (2017.08)

(58) Field of Classification Search
None
See application file for complete search history.

(56) References Cited

U.S. PATENT DOCUMENTS

| | | | |
|---|---|---|---|
| 2,459,520 A | 1/1949 | Greenshields | |
| 5,057,370 A | 10/1991 | Krieg et al. | |
| 5,360,582 A | 11/1994 | Boyd et al. | |
| 5,501,934 A | 3/1996 | Sukata et al. | |
| 5,506,061 A | 4/1996 | Kindl et al. | |
| 5,583,176 A | 12/1996 | Haberle | |
| 6,004,712 A | 12/1999 | Barbetta et al. | |
| 6,348,279 B1 | 2/2002 | Saito et al. | |
| 7,329,698 B2 | 2/2008 | Noguchi et al. | |
| 7,623,340 B1 | 11/2009 | Song et al. | |
| 8,168,964 B2 | 5/2012 | Hiura et al. | |
| 8,216,541 B2 | 7/2012 | Jang et al. | |
| 8,580,132 B2 | 11/2013 | Lin et al. | |
| 9,758,379 B2 * | 9/2017 | Blair .................. | C01B 32/192 |
| 9,802,206 B2 | 10/2017 | Kitaura et al. | |
| 2002/0008031 A1 | 1/2002 | Barsukov et al. | |
| 2002/0119358 A1 | 8/2002 | Rock | |
| 2004/0000735 A1 | 1/2004 | Gilbert, Sr. et al. | |
| 2004/0033189 A1 | 2/2004 | Kaschak et al. | |
| 2004/0071896 A1 | 4/2004 | Kang | |
| 2005/0191471 A1 | 9/2005 | Haggquist | |
| 2005/0196636 A1 | 9/2005 | Kawakami et al. | |
| 2005/0208319 A1 | 9/2005 | Finley et al. | |
| 2007/0219336 A1 | 9/2007 | Ito | |
| 2007/0284557 A1 | 12/2007 | Gruner et al. | |
| 2008/0048152 A1 | 2/2008 | Jang et al. | |
| 2008/0206124 A1 | 8/2008 | Jang et al. | |
| 2008/0279710 A1 | 11/2008 | Zhamu et al. | |
| 2008/0318110 A1 | 12/2008 | Budinski et al. | |
| 2009/0017211 A1 | 1/2009 | Gruner et al. | |
| 2009/0092747 A1 | 4/2009 | Zhamu et al. | |
| 2009/0140801 A1 | 6/2009 | Ozyilmaz et al. | |
| 2009/0215953 A1 | 8/2009 | Hwang et al. | |
| 2009/0241496 A1 | 10/2009 | Pintault et al. | |
| 2010/0006445 A1 | 1/2010 | Tomantschger | |
| 2010/0044646 A1 * | 2/2010 | Zhamu ................. | B82Y 30/00 252/511 |
| 2010/0055025 A1 | 3/2010 | Jang et al. | |
| 2010/0055458 A1 | 3/2010 | Jang et al. | |
| 2010/0056819 A1 | 3/2010 | Jang et al. | |
| 2010/0143732 A1 | 6/2010 | Swift et al. | |
| 2010/0147188 A1 | 6/2010 | Mamak et al. | |
| 2010/0151318 A1 | 6/2010 | Lopatin et al. | |
| 2010/0209731 A1 | 8/2010 | Humano | |
| 2010/0239870 A1 | 9/2010 | Bowen | |
| 2010/0296253 A1 | 11/2010 | Miyamoto et al. | |

(Continued)

FOREIGN PATENT DOCUMENTS

| | | |
|---|---|---|
| CN | 102021633 A | 4/2011 |
| CN | 102719719 A | 7/2012 |

(Continued)

OTHER PUBLICATIONS

Pauling ("Chapter 15: Oxidation-Reduction Reactions. Electrolysis." General Chemistry, 1988, p. 512-550) (Year: 1988).*

(Continued)

*Primary Examiner* — Jafar F Parsa
*Assistant Examiner* — Amy C Bonaparte
(74) *Attorney, Agent, or Firm* — Edwin S. Flores; Chalker Flores, LLP

(57) ABSTRACT

Existing methods of producing high quality graphene/graphite oxides are generally accomplished by exfoliating graphite into flakes and oxidizing the graphite flakes with strong oxidizers under extreme conditions and require careful purification. The oxidizers are typically strong acids used in high concentrations at elevated temperatures requiring complicated purification processes to yield oxidized graphene/sheets. The existing processes can cost up to $12,000/gram. This invention uses a mild oxidant combined with mechanical processing where the sole products are oxidized graphite/graphene and water without the need for further purification.

14 Claims, No Drawings

(56) References Cited

U.S. PATENT DOCUMENTS

| | | |
|---|---|---|
| 2011/0017585 A1 | 1/2011 | Zhamu et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0143018 A1 | 6/2011 | Peng et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0077017 A1 | 3/2012 | Buresch |
| 2012/0107562 A1 | 3/2012 | Bolotin et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0240033 A1 | 9/2013 | Jeon et al. |
| 2013/0272950 A1 | 10/2013 | Yun et al. |
| 2014/0018480 A1 | 1/2014 | Lee et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0367436 A1 | 12/2015 | Chiu et al. |
| 2016/0002045 A1 | 1/2016 | Blair |
| 2016/0016803 A1 | 1/2016 | Stoltz et al. |
| 2017/0233290 A1 | 8/2017 | Christiansen et al. |

FOREIGN PATENT DOCUMENTS

| | | |
|---|---|---|
| CN | 103058541 A | 4/2013 |
| CN | 103130436 A | 6/2013 |
| CN | 103408880 A | 11/2013 |
| CN | 103757823 A | 4/2014 |
| CN | 103819915 A | 5/2014 |
| CN | 103962102 A | 8/2014 |
| CN | 104319372 A | 1/2015 |
| CN | 104446176 A | 3/2015 |
| CN | 104844930 A | 4/2015 |
| EP | 2771395 A1 | 9/2014 |
| EP | 2964573 A1 | 1/2016 |
| EP | 2964574 A4 | 5/2016 |
| JP | 64-009808 A | 1/1989 |
| JP | 2016508953 A | 3/2016 |
| KR | 20110119429 A | 11/2011 |
| KR | 20130048741 A | 4/2013 |
| KR | 1020130090979 A | 8/2013 |
| KR | 101625311 B1 | 5/2016 |
| WO | 2009032069 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011074125 A1 | 6/2011 |
| WO | 2011078639 A2 | 6/2011 |
| WO | WO 2011078639 * | 6/2011 |
| WO | 2011086391 A1 | 7/2011 |
| WO | 2011087301 A1 | 7/2011 |
| WO | 2011162727 A1 | 12/2011 |
| WO | 2012058553 A2 | 5/2012 |
| WO | 2012148880 A2 | 11/2012 |
| WO | 2012177864 A1 | 12/2012 |
| WO | 2013001266 A1 | 1/2013 |
| WO | 2013009003 A1 | 1/2013 |
| WO | 2013096990 A1 | 7/2013 |
| WO | 2014080144 A1 | 5/2014 |
| WO | 2014104446 A1 | 7/2014 |
| WO | 2014210584 A1 | 12/2014 |
| WO | 2015065893 A1 | 5/2015 |
| WO | 2016040612 A1 | 3/2016 |
| WO | 2016123080 A1 | 8/2016 |
| WO | 2016200469 A1 | 12/2016 |
| WO | 2017053204 A1 | 3/2017 |

OTHER PUBLICATIONS

Kirschner ("Ozone" Ullmann's Encyclopedia of Industrial Chemistry, p. 637-645, first published online Jun. 15, 2000) (Year: 2000).*

Li ("Oxidation of single-walled carbon nanotubes in dilute aqueous solutions by ozone as affected by ultrasound" Carbon, 46, 2008, p. 466-475) (Year: 2008)*

An ("Electrophoretic deposition of carbon nanotubes onto carbon-fiber fabric for production of carbon/epoxy composites with improved mechanical properties" Carbon 50, 2012, p. 4130-4143) (Year: 2012).*

Hennrich ("Chapter one: The element carbon" Carbon Nanotubes: Properties and Applications, 2006, p. 1-18) (Year: 2006).*

Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.

Feng, H., et al., "A low-temperature method to produce highly reduced graphene oxide," Nature Communications, Feb. 26, 2013, 8 pp.

Szabo, T., et al., "Evolution of Surface Functional Groups in a Series of Progressively Oxidized Graphite Oxides," Chem. Mater., vol. 18, Mar. 29, 2006, pp. 2740-2749.

Extended European Search Report for EP 16765526.5 dated Feb. 13, 2018, 7 pages.

Extended European Search Report for EP 16769452.0 dated Mar. 1, 2018, 9 pages.

Extended European Search Report for EP 16780450.9 dated Apr. 19, 2018, 17 pages.

Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.

Li, Y., et al., "Hybridizing wood cellulose and graphene oxide toward high-performance fibers," NPG Asia Materials, 7, Jan. 9, 2015, 14 pp.

Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.

Tissera, N., et al., "Hydrophobic cotton textile surfaces using an amphiphilic graphene oxide (GO) coating," Applied Surface Science, 324, Nov. 4, 2014 (2015), pp. 455-463.

Yuanyuan, L., et al. "Hybridizing Wood Cellulose and Graphene Oxide toward High-Performance Fibers," NPG Asia Materials (2015) 7(e150), 14 pp.

Extended European Search Report and Opinion for EPO 12844344.7 dated Oct. 22, 2015, 8 pp.

Extended European Search Report and Opinion for EPO 14760912.7 dated May 11, 2016, 8 pp.

Extended European Search Report and Opinion for EPO 14759787.6 dated Oct. 6, 2016, 13 pp.

FMC (http://ww.peroxychem.com/media/90826/aod_brochure_persulfate.pdf, downloaded on Jan. 19, 2017) 16 pp.

International Search Report and Written Opinion for PCT/US2012/061457 from KIPO dated Mar. 15, 2013, 10 pp.

International Search Report and Written Opinion for PCT/US2014/021810 from KIPO dated Jul. 14, 2014, 10 pp.

International Search Report and Written Opinion for PCT/US2014/021765 from KIPO dated Jul. 24, 2014, 11 pp.

(56) References Cited

OTHER PUBLICATIONS

International Search Report and Written Opinion for PCT/US2014/062371 from KIPO dated Feb. 11, 2015, 12 pp.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.
International Search Report and Written Opinion for PCT/US2016/014873 from KIPO dated May 13, 2016, 15 pp.
International Search Report and Written Opinion for PCT/US2016/022229 from KIPO dated Jun. 27, 2016, 15 pp.
International Search Report and Written Opinion for PCT/US2016/023273 from KIPO dated Jul. 12, 2016.
International Search Report and Written Opinion for PCT/US2016/023435 from KIPO dated May 30, 2016, 13 pp.
International Search Report and Written Opinion for PCT/US2016/025307 from KIPO dated Sep. 12, 2016, 11 pp.
International Search Report and Written Opinion for PCT/US2016/025338 from KIPO dated Jul. 25, 2016, 12 pp.
International Search Report and Written Opinion for PCT/US2016/052292 from KIPO dated Nov. 21, 2016, 14 pp.
Academic Press Dictionary of Science and Technology ("Flake", p. 1, obtained onkine Aug. 19, 2016).
Ebinezar, et al., "Analysis of hardness test for aluminum carbon nanotube metal matrix and graphene," Indian Journal of Engineering, vol. 10, No. 21, 2014, pp. 33-39.
Fang, Ming et al., "Covalent polymer functionalization of graphenenanosheets and mechanical properties of composites" Journal of Materials Chemistry, 2009, vol. 19, No. 38, pp. 7098-7105.
Herman, Allen et al., "Bipolar plates for PEM fuel cells: a review." International Journal of Hydrogen Energy, 2005, vol. 30, No. 12, pp. 1297-1302.
Hwang, T., et al., "One-step metal electroplating and patterning on a plastic substrate using an electrically-conductive layer of few-layer graphene," Carbon, Sep. 17, 2011, vol. 50, No. 2, pp. 612-621.
Jeon, In-Yup et al., "Edge-carboxylated graphene nanosheets via ball milling." Proceedings of the National Academy of Sciences of the United States of AmericaPNAS, Apr. 10, 2012, vol. 109, No. 15, pp. 5588-5593.
Liu, Y. B., et al., "Recent development in the fabrication of metal matrix-particulate composites using powder metallurgy techniques," Journal of Materials Science, vol. 29, No. 8, 1994, pp. 1999-2007.

McQuarrie (2011, General Chemistry (4th Edition). University Science Books, Appendix G "Standard Reduction Voltages for Aqueous Solutions at 25C, p. A-34 to A-37 and also p. 949, Table 25.3. Online version available at:http://app.knovel.com/hotlink!toc/id:kpGCE00013/general-chemistry-4th/general-chemistry-4th)".
Merriam-Webster ("Definition of Flake" p. 1-9, obtained online Aug. 19, 2016).
Mohajerani, E., et al., "Morphological and thickness analysis for PMMA spin coated films," Journal of Optoelectronics and Advanced Materials, vol. 9:12, Dec. 2007, p. 3901-3906.
Moustafa, S.F., et al., "Copper matrix SiC and Al2O3 particulate composites by powder metallurgy technique," Materials Letters, 2002, vol. 53, No. 4, pp. 244-249.
Ong, T. S., et al, "Effect of atmosphere on the mechanical milling of natural graphite," Carbon, 2000, vol. 38, No. 15, pp. 2077-2285.
Rafiee, Mohammad A. et al., "Fracture and fatigue in graphene nanocomposites." Small, 2010, vol. 6, No. 2, pp. 179-183.
Steurer, Peter et al., "Functionalized graphenes and thermoplasticnanocomposites based upon expanded graphite oxide." Macromolecular Rapid Communications, 2009, vol. 30, Nos. 4-5, pp. 316-327.
Taeseon, Hwang, et al.,"One-step metal electroplating and patterning on a plastic substrate using an electrically conductive layer of few-layer graphene," Carbon, Elsevier, Oxford, GB, vol. 50, No. 2, Sep. 8, 2011, pp. 612-621.
USP Technologies, "What is the pH of H2O2 solutions?," http://www.h2o2.com/faqs/FaqDetail.aspx?fId=26, accessed Jan. 19, 2017, 2 pp.
Wang, Xin et al., "In situ polymerization of graphene nanosheets and polyurethane with enhanced mechanical and thermal properties," Journal of materials Chemistry, 2011, vol. 21, No. 12, pp. 4222-4227.
Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.
Wu, Z-S. et al., "Field Emission of Single-Layer Graphene Films Prepared by Electrophoretic Deposition." Advanced Materials, vol. 21, 2009, pp. 1756-1760.
Zhao, W., et al., "Preparation of graphene by exfoliation of graphite using wet ball milling." Journal of Materials Chemistry, Jun. 3, 2010, vol. 20, pp. 5817-5819.
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.

* cited by examiner

LARGE SCALE OXIDIZED GRAPHENE PRODUCTION FOR INDUSTRIAL APPLICATIONS

PRIORITY CLAIM AND CROSS-REFERENCE TO RELATED APPLICATIONS

This patent application is a continuation of U.S. patent application Ser. No. 14/772,898 filed on Sep. 4, 2015; which claims priority to the International Patent Application Ser. No. PCT/US2014/021810, filed on Mar. 7, 2014, which claims the benefit of U.S. Provisional Application Ser. No. 61/774,633, filed Mar. 8, 2013, each of which is hereby incorporated by reference in its entirety.

TECHNICAL FIELD OF THE INVENTION

The present invention relates in general to the field of graphene manufacturing, and more particularly, to large scale oxidized graphene production for industrial applications.

BACKGROUND OF THE INVENTION

Without limiting the scope of the invention, its background is described in connection with composite materials.

U.S. Pat. No. 8,580,132, issued to Lin, et al., is directed to a method for making strip shaped graphene layer. Briefly, these inventors describe a method for making a strip shaped graphene layer that includes the steps of: providing a graphene film on a surface of a substrate, drawing a carbon nanotube film composite is disposed on the graphene film, partly removing the polymer material to expose the plurality of carbon nanotube segments, etching the plurality of carbon nanotube segments and the graphene film covered by the plurality of carbon nanotube segments, and removing the remained polymer material to obtain the strip shaped graphene layer.

U.S. Pat. No. 8,216,541, issued to Jang, et al. is directed to a process for producing dispersible and conductive nano-graphene platelets from non-oxidized graphitic materials. Briefly, these inventors are said to teach a process for producing nano-graphene platelets (NGPs) that are both dispersible and electrically conducting. The process is said to includes: (a) preparing a pristine NGP material from a graphitic material; and (b) subjecting the pristine NGP material to an oxidation treatment to obtain the dispersible NGP material, wherein the NGP material has an oxygen content no greater than 25% by weight. The conductive NGPs are said to find applications in transparent electrodes for solar cells or flat panel displays, additives for battery and supercapacitor electrodes, conductive nanocomposite for electromagnetic wave interference (EMI) shielding and static charge dissipation.

United States Patent Publication No. 20120298620, filed by Jiang, et al., is directed to a method for making graphene composite structure. Briefly the method is said to include providing a metal substrate including a first surface and a second surface opposite to the first surface, growing a graphene film on the first surface of the metal substrate by a CVD method, providing a polymer layer on the graphene film and combining the polymer layer with the graphene film, and forming a plurality of stripped electrodes by etching the metal substrate from the second surface.

Finally, United States Patent Publication No. 20120228555, filed by Cheng, et al., is directed to a method of making graphene. Briefly, the application is said to disclose a method for making graphene by providing a starting material and heating the starting material for a time and to a temperature effective to produce graphene. In certain embodiments the applicants are said to use starting materials that include carbonaceous materials used in conjunction with, or comprising, sulfur, and essentially free of a transition metal. The graphene produced by the current method is said to be used to coat graphene-coatable materials.

SUMMARY OF THE INVENTION

In one embodiment, the present invention includes a method of making graphene oxide, comprising: placing graphite into water containing and an oxidizing agent, wherein said oxidizing agent has an oxidation potential less than 2V; mechanically exfoliating graphite into graphene flakes; and separating the graphene flakes from the water, wherein the graphene flakes are substantially flat. In one aspect, the step of mechanically exfoliating graphite into graphene flakes in done in a stirred media mill. In another aspect, the step of mechanically exfoliating graphite into graphene flakes in done in a stirred media mill, and the stirred media mill is an Attrition mill, a dry grind Attritor, a wet grind Attritor, a regular speed Attritor, and a high speed Attritor or a Attritor. In another aspect, the method produces an output that is substantially limited to substantially flat graphene flakes and water. In another aspect, the oxidizing agent is selected from at least one of $CO_2$, $O_2$, steam, $N_2O$, NO, $NO_2$, $O_3$, $ClO_2$, or $H_2O_2$, at a concentration wherein the oxidation potential is less than 2V. In another aspect, the oxidizing agent is aqueous or non-aqueous. In another aspect, the pH of the water containing the oxidized graphene flakes is from pH 2 to pH 9. In another aspect, the pH of the resulting water graphene flakes mixture is about 7. In another aspect, the graphene flakes are oxidized from 1% to 15%. In another aspect, the method further comprises the step of precipitating any remaining graphite by increasing the pH of the mixture above pH 9, or below a pH of 3.

Yet another embodiment of the present invention includes a method of making graphene flakes, comprising: placing graphite into water containing and an oxidizing agent, wherein said oxidizing agent is at a concentration at which it has an oxidation potential less than 2V; mechanically exfoliating graphite into graphene flakes; and separating the graphene flakes from the water, wherein the graphene flakes are substantially flat. In one aspect, the step of mechanically exfoliating graphite into graphene flakes in done in a stirred media mill. In another aspect, the step of mechanically exfoliating graphite into graphene flakes in done in a stirred media mill, and the stirred media mill is an Attrition mill, a dry grind Attritor, a wet grind Attritor, a regular speed Attritor, and a high speed Attritor or a Attritor. In another aspect, the method produces an output that is substantially limited to substantially flat graphene flakes and water. In another aspect, the oxidizing agent is selected from at least one of $CO_2$, $O_2$, steam, $N_2O$, NO, $NO_2$, $O_3$, $ClO_2$, or $H_2O_2$, at a concentration wherein the oxidation potential is less than 2V. In another aspect, the oxidizing agent is aqueous or non-aqueous. In another aspect, the pH of the water containing the oxidized graphene flakes is from pH 2 to pH 9. In another aspect, the pH of the resulting water graphene flakes mixture is about 7. In another aspect, the graphene flakes are oxidized from 1% to 15%. In another aspect, the method further comprises the step of precipitating any remaining graphite by increasing the pH of the mixture above pH 9, or below a pH of 3.

Yet another embodiment of the present invention includes a graphene oxide made by a method comprising: placing graphite into water containing and an oxidizing agent, wherein said oxidizing agent has an oxidation potential less than 2V; mechanically exfoliating graphite into graphene flakes; and separating the graphene flakes from the water, wherein the graphene flakes are substantially flat.

Yet another embodiment of the present invention includes a graphene flakes made by a method comprising: placing graphite into water containing and an oxidizing agent, wherein said oxidizing agent is at a concentration at which it has an oxidation potential less than 2V; mechanically exfoliating graphite into graphene flakes; and separating the graphene flakes from the water, wherein the graphene flakes are substantially flat.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Graphene is one of the strongest materials ever tested. Measurements have shown that graphene has a breaking strength 200 times greater than steel, with a tensile modulus (stiffness) of 1 TPa (150,000,000 psi). An atomic Force Microscope (AFM) has been used to measure the mechanical properties of a suspended graphene sheet. Graphene sheets, held together by van der Waals forces, were suspended over $SiO_2$ cavities where an AFM tip was probed to test its mechanical properties. Its spring constant was in the range 1-5 N/m and the Young's modulus was 0.5 TPa (500 GPa) thereby demonstrating that graphene can be mechanically very strong and rigid. Despite these nanoscale mechanical properties, Graphene has not been able to transition to a macro-scale mechanical structure. Various research institutes have loaded plastic/polymer/epoxy with carbon nanotubes (CNT), graphene flakes (GF), and graphene oxide (GO) and seen up to a 200% increase in tensile strength in the loaded plastic/polymer/epoxy. The process of producing a loaded plastic/polymer/epoxy does not translate to a commercially viable composite structure.

The inability to translate the technology to a viable composite structure is a combination of technical issues and cost factors. The technical limitation includes stochastic processes in the curing of the plastic/polymer/epoxy that results in random shrinkage phenomena that is exacerbated in larger composite structures/devices. The distribution of the laded mechanical structural materials (CNT, GF, and GO) is non-uniform creating weak regions and failure points in the loaded plastic/polymer/epoxy material. The superior properties of graphene compared to polymers are also reflected in polymer/graphene nanocomposites. Polymer/graphene nanocomposites show superior mechanical, thermal, gas barrier, electrical and flame retardant properties compared to the neat polymer. Improvement in the physicochemical properties of the nanocomposites depends on the distribution of graphene layers in the polymer matrix as well as interfacial bonding between the graphene layers and polymer matrix. The combined low yield and high cost of the CNT, GF, and GO materials makes the approach not viable. Interfacial bonding between graphene and the host polymer dictates the final properties of the graphene reinforced polymer nanocomposite.

Graphene is an allotrope of carbon. Graphene's structure is a one-atom-thick planar sheet of $sp^2$-bonded carbon atoms that are densely packed in a honeycomb or hexagonal crystal lattice. The carbon-carbon bond length in graphene is about 1.42 Å. Graphene sheets stack to form graphite with an inter-planar spacing of 3.35 Å. Multiple graphene sheets/flakes are bonded together by van der Waals forces.

Graphene can be oxidized by a number of processes including thermal, chemical or chemical-mechanical. Reduction of graphite oxide monolayer films by hydrazine, annealing in argon/hydrogen was reported to yield graphene films of low quality. Graphene can be produced in significant quantities from microcrystalline graphite that is treated with a mixture of acids such as sulfuric, nitric, and other oxidizing chemical in combination mechanical and/or thermal energy elements. This processing will produce graphene flakes ranging from a few nanometers to tens of microns depending and the specific processing environment. If one uses a mill in conjunction with an oxidizing agent the dwell time in the mill will determine the size of the flake of graphene. In general, the longer the processing time in the mill the smaller the graphene flake. The oxidizing process produces a carboxyl group on the perimeter of the graphene flake. The resulting graphene flakes can be on the order of 5 Å in thickness and can be suspended in a number of solvents with a dielectric constant greater than 32. These include, but are not limited to N-methylpyrrolidone, acetonitrile, dimethyl sulfoxide, propylene carbonate, water, and formamide.

Using strong oxidizers such as sulfuric and nitric acids result in a graphene oxide with texturing and folding of the individual sheets/flakes and the loss of carboxylic group functionality. The products of this synthesis technique are graphite/graphene oxide. Separating the strong oxidizer reactants from the products is a time consuming and expensive process. The graphene/graphite oxide, without the strong oxidizers, has an oxygen content ranging between 1 and 50 wt %. Graphite/Graphene oxide contains oxygen attached to the layers as both epoxy bridges and hydroxyl groups (—COOH). The oxidized graphene/graphite is hydrophilic. Analyses show that the graphene particle/flake is fully oxidized with —COOH groups along the edges.

Production of graphene oxides requires the use of oxidizing agent in conjunction with mechanical energy (milling). Mechanical processing can be energy efficient and prevents the decomposition of the chemical functionalities that can occur during thermal processing. Oxidizing agents can either be aqueous or non-aqueous graphene/graphite. Published literature had identified urea hydrogen peroxide adduct (UHPA) for use in solvent free and non-aqueous chemical reactions as a solid source of hydrogen peroxide. UHPA provides a basis for anhydrous, solid delivery system for $H_2O_2$.

Oxidized graphene can be produced in a wide number of mechanical milling apparatus that create the necessary mechanical energy. The current device being used is an attrition mill or Attritor. The Attritor is a grinding mill containing internally agitated media such as balls, cylinders or pebbles. It has been generically referred to as a "stirred ball mill." There are quite a few types of Attritors; which can be categorized as dry grind Attritors, wet grind Attritors, regular speed Attritors, and high speed Attritors.

A useful and simple equation describing the grinding momentum is M×V (mass×velocity), which enables a determination of how the Attritor fits into the family of mills. For example, ball mills use large media, normally ½" or larger, and run at a low (10-50) rpm. The other mills, such as sand, bead, and horizontal, use smaller media from 0.3 mm to 2 mm, but run at a very high rpm (roughly 800-1200). High-speed dispersers with no media run even faster rpm (1200-1800).

The most important aspect for the Attritor is that the power input is directly used for agitating the media to achieve grinding and is generally not used for rotating or vibrating a large, heavy tank in addition to the media.

The present inventors have found that for efficient, fine grinding, both impact action and shearing force are required. When wet grinding in the Attritor as the balls (media) in their random movement are spinning in different rotation and, therefore, exerting shearing forces on the adjacent slurry. As a result, both liquid shearing force and media impact force are present. Such combined shearing and impact results in size reduction as well as good dispersion.

This invention includes a method for low cost, mass-production of a partially oxidized to fully oxidized graphite/graphene material using mechanical processing (Attritor Mill) in conjunction with a oxidizing agent with an oxidation potential less than 2V, that produces oxidized graphite/graphene and water as its sole product or output requiring no additional post processing for purification to create a suspension, concentration, or dried powder. Directly milling of graphite powder in an aqueous oxidizing agent with an oxidation potential less than 2V, without the need for concentrated acid, exfoliation, or filtration/purification process to produce high quality oxidized graphene/graphite was demonstrated. The use of an aqueous or non-aqueous oxidizing agent with an oxidation potential less than 2V produces oxidized graphene with no distortion or texturing. Prior to this technological advancement the use of a strong oxidizing agent such as manganic or nitric acids with an oxidation potential >2V produced oxidized graphite/graphite that is both expensive and highly textured. Textured graphene oxide produces significant problems when depositing the graphene oxide, using the graphene oxide in a suspension or as an additive to other either aqueous or non-aqueous media.

Larger scale milling experiments were performed in an Attritor with 6 lbs (2.7 Kg) (or ~2,600 stainless steel balls) of 0.25" diameter stainless steel balls weighing 1 g each. Typically, graphite (TC306, 30 g) was milled with an aqueous or non-aqueous oxidizing agent with an oxidation potential less than 2V such as 35% hydrogen peroxide ($H_2O_2$) (96 ml or 107 g) or aqueous or non-aqueous media caring ozone $O_3$. Milling was carried out for 120 minutes at 350 RPM. The mechanical agitation supplied by the Attritor is sufficient to prevent agglomeration of the graphite or the graphite from adhering to the milling balls or tank during the oxidation process. Mills where the tank is agitated (such as a shaker mill, planetary mill, or pebble mill), in general, do not effectively agitate liquid/solid mixtures with high solid content. These mills cannot prevent agglomeration or the graphite from adhering to the milling balls and tank. Once the milling balls are entrained in the graphite/oxidant mixture the process must be stopped and the mechanical system cleaned. No additional cooling, processing, or purification is required to produce the oxidized graphite/graphene and water slurry. The pH of the water containing the oxidized graphite/graphene can range from 2 to 9 while maintaining the suspension of the media the pH of the resulting water/graphene mixture is typically is 7. The resulting graphite/graphene is oxidized from 1% to 15% depending on and a function of the quantity of oxidizing agent with an oxidation potential less than 2V used in the process. The optimal amount of oxidizing agent with an oxidation potential less than 2V, is 4 to 1 molar equivalent weight of graphite to oxidizing agent with an oxidation potential less than 2V, to produce 15% oxidation of the graphite. Larger portions of oxidizing agent with an oxidation potential less than 2V, may be used but it does not increase the percentage of oxidation. Lower molar equivalent weights of oxidizing agent with an oxidation potential less than 2V, may be used resulting in a lower percentage of graphite a 10 to 1 or 15 to 1 molar equivalent weight of graphite to oxidizing agent with an oxidation potential less than 2V will result in a graphite oxidation percentage ranging 8% to 5%. In addition, graphene with oxidation percentages less than 5% are not dispersible in a polar solvent and/or depositable.

The chemical reactions (—COOH) of the edge carbons would preserve the graphene structure. Oxidized graphite produced by this method is very hydrophilic and is easily suspended in an aqueous solution. The oxidized graphite can be kept in solution until varying the pH of the solution. If the solutions pH is increased above 9 or decreased below 3 the oxidized graphite suspension will precipitate out of solution. The acidic precipitation process is reversible and the oxidized graphite will return to a suspension as the pH is increased above 3. As the pH is increased the smaller oxidized graphite flakes return into the suspension first. This phenomenon can be used as a method to both purify the oxidized graphite flakes and separate the flakes by size. Basic precipitation does not return to a suspension as the pH is decreased to a pH of 7.

The resulting suspension had the pH decreased to precipitate the suspension and dried. The precipitate can then be washed with deionized (DI) water. The DI water also raises the pH of the material and re-suspends the oxidized graphite/graphene. The suspended oxidized graphite/graphene can easily be placed in almost any solution as long as the pH is between 3 and 9. The resulting suspension can be deposited by any number of processes including electroreduction, spin, spray pyrolysis, dip, Langmuir Blodgett or other coating processes plus used as an additive for loaded materials such as plastics, epoxies, metals ceramics and paints. The oxidation of the graphite/graphene was validated by the aqueous suspension and acid based precipitation then resuspended. The purified graphite/graphene oxide without texturing was then deposited on a surface and evaluated for its electrical, optical, and mechanical properties. This is a 100 fold improvement over prior developments and over a 100,000 fold improvement over commercially available oxidized graphite/graphene technology enabling graphene to be viable for industrial applications. Where the resulting oxidized graphene/graphite has been oxidization percentage between 5 and 25 percent at costs less than significantly less than current methods.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making graphene oxide, consisting essentially of:

placing graphite into water containing an oxidizing agent, wherein said oxidizing agent is at a concentration at which it has an oxidation potential less than 2V;

mechanically exfoliating the graphite and simultaneously oxidizing the graphite into graphene oxide flakes, wherein the step of mechanically exfoliating graphite into graphene oxide flakes is done in a stirred media mill, and the stirred media mill is an attrition mill, a dry grind attritor, a wet grind attritor, a regular speed attritor, a high speed attritor, or an attritor; and separating the graphene oxide flakes from the water, wherein the graphene oxide flakes are flat.

2. The method of claim 1, wherein the oxidizing agent is selected $CO_2$, $O_2$, steam, $N_2O$, NO, $NO_2$, $O_3$, $ClO_2$, or $H_2O_2$.

3. The method of claim 1, wherein the oxidizing agent is aqueous or non-aqueous.

4. The method of claim 1, wherein the pH of the water containing the graphene oxide flakes is from pH 2 to pH 9.

5. The method of claim 1, wherein the pH of the resulting water graphene oxide flakes mixture is about 7.

6. The method of claim 1, wherein 1% to 15% of the graphite is oxidized to become graphene oxide flakes.

7. The method of claim 1, further comprising the step of precipitating any remaining graphite by increasing the pH of the resulting water graphene oxide flakes mixture above pH 9, or by decreasing the pH of the resulting water graphene oxide flakes mixture below a pH of 3.

8. A method of making graphene flakes and graphene oxide flakes, consisting essentially of:

placing graphite into water containing an oxidizing agent, wherein said oxidizing agent is at a concentration at which it has an oxidation potential less than 2V;

mechanically exfoliating graphite and simultaneously oxidizing the graphite into graphene oxide flakes and graphene flakes, wherein the step of mechanically exfoliating graphite into graphene oxide flakes and graphene flakes is done in a stirred media mill, and the stirred media mill is an attrition mill, a dry grind attritor, a wet grind attritor, a regular speed attritor, a high speed attritor, or an attritor; and separating the graphene flakes and graphene oxide flakes from the water, wherein the graphene flakes and graphene oxide flakes are flat.

9. The method of claim 8, wherein the oxidizing agent is $CO_2$, $O_2$, steam, $N_2O$, $NO$, $NO_2$, $O_3$, $ClO_2$, or $H_2O_2$.

10. The method of claim 8, wherein the oxidizing agent is aqueous or non-aqueous.

11. The method of claim 8, wherein the pH of the water containing the graphene flakes and graphene oxide flakes is from pH 2 to pH 9.

12. The method of claim 8, wherein the pH of the resulting water graphene flakes and graphene oxide flakes mixture is about 7.

13. The method of claim 8, wherein 1% to 15% of the graphite is oxidized to become the graphene oxide flakes.

14. The method of claim 8, further comprising the step of precipitating any remaining graphite by increasing the pH of the resulting water, graphene oxide flakes, and graphene flakes mixture above pH 9 or by decreasing the pH of the resulting water, graphene oxide flakes, and graphene flakes mixture below a pH of 3.

* * * * *